United States Patent
Takahashi et al.

(10) Patent No.: US 8,480,057 B2
(45) Date of Patent: Jul. 9, 2013

(54) MICROVALVE AND VALVE SEAT MEMBER

(75) Inventors: Yuki Takahashi, Nagaokakyo (JP); Kenichi Kontani, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/977,228

(22) Filed: Dec. 23, 2010

(65) Prior Publication Data

US 2011/0127459 A1 Jun. 2, 2011

(30) Foreign Application Priority Data

Jun. 27, 2008 (JP) .................................. 2008-168037

(51) Int. Cl.
*F16K 1/42* (2006.01)

(52) U.S. Cl.
USPC .............................. 251/363; 251/360; 251/333

(58) Field of Classification Search
USPC ................... 251/61.1, 129.06, 359, 360, 363, 251/129.01, 364, 331, 333
See application file for complete search history.

(56) References Cited

U.S. PATENT DOCUMENTS

| | | | | | |
|---|---|---|---|---|---|
| 826,625 | A | * | 7/1906 | Templeton | 137/328 |
| 1,493,784 | A | * | 5/1924 | Larson | 251/363 |
| 1,577,913 | A | * | 3/1926 | Larson | 251/363 |
| 1,985,382 | A | * | 12/1934 | Schachter | 251/363 |
| 2,053,006 | A | * | 9/1936 | Noss | 251/363 |
| 2,210,046 | A | * | 8/1940 | Schubring | 251/364 |
| 2,616,653 | A | * | 11/1952 | Tarr | 251/333 |
| 3,362,680 | A | * | 1/1968 | Weiss | 251/360 |
| 3,547,399 | A | * | 12/1970 | Soderquist | 251/86 |
| 3,844,532 | A | * | 10/1974 | Buck | 251/360 |
| 4,340,083 | A | * | 7/1982 | Cummins | 137/499 |
| 4,617,952 | A | * | 10/1986 | Fujiwara et al. | 137/85 |
| 4,715,578 | A | * | 12/1987 | Seltzer | 251/25 |
| 5,080,120 | A | * | 1/1992 | Jordan | 137/1 |
| 5,161,774 | A | | 11/1992 | Engelsdorf et al. | |

(Continued)

FOREIGN PATENT DOCUMENTS

| | | |
|---|---|---|
| DE | 906276 C | 3/1954 |
| EP | 0913609 A1 | 5/1999 |

(Continued)

OTHER PUBLICATIONS

Official Communication issued in International Patent Application No. PCT/JP2009/061475, mailed on Jul. 21, 2009.

(Continued)

*Primary Examiner* — John K Fristoe, Jr.
*Assistant Examiner* — Andrew J Rost
(74) *Attorney, Agent, or Firm* — Keating & Bennett, LLP

(57) ABSTRACT

In a microvalve, a valve seat includes a cylinder portion that includes a through hole in a central portion thereof, and a flange portion that is provided around an axial end of the cylinder portion and that has a thick seal portion on a periphery of the flange portion. The cylinder portion is disposed in an opening of a valve housing with a gap δ therebetween, and the seal portion is able to move away from the seal surface provided around the opening and away from the displacement member. In an open state, at least one of a flow path through the through hole and a flow path through the gap between the cylinder portion and the opening is open, and in a closed state, the seal portion is sandwiched between the displacement member and the seal surface.

6 Claims, 7 Drawing Sheets

U.S. PATENT DOCUMENTS

| | | | |
|---|---|---|---|
| 5,188,150 A * | 2/1993 | Esplin | 137/630.14 |
| 5,593,134 A * | 1/1997 | Steber et al. | 251/129.17 |
| 5,779,218 A * | 7/1998 | Kowanz | 251/129.06 |
| 6,125,877 A | 10/2000 | Ossenbruegge et al. | |
| 6,149,123 A | 11/2000 | Harris et al. | |
| 6,736,370 B1 | 5/2004 | Crockett et al. | |
| 7,198,250 B2 * | 4/2007 | East | 251/129.06 |
| 2007/0056634 A1 | 3/2007 | Yokoi et al. | |
| 2009/0242813 A1 | 10/2009 | Hirata et al. | |

FOREIGN PATENT DOCUMENTS

| | | |
|---|---|---|
| JP | 60-65479 U | 5/1985 |
| JP | 62-028585 A | 2/1987 |
| JP | 04-506105 A | 10/1992 |
| JP | 11-248010 A | 9/1999 |
| JP | 2001-502248 A | 2/2001 |
| JP | 2003-021249 A | 1/2003 |
| JP | 2006-77823 A | 3/2006 |
| JP | 2007-107715 A | 4/2007 |
| JP | 2008-082440 A | 4/2008 |
| WO | 96/17192 A1 | 6/1996 |
| WO | 2008/081767 A1 | 7/2008 |

OTHER PUBLICATIONS

Official Communication issued in corresponding European Patent Application No. 09770184.1, mailed on Feb. 25, 2013.

* cited by examiner

MICROVALVE AND VALVE SEAT MEMBER

BACKGROUND OF THE INVENTION

1. Field of the Invention

The present invention relates to a microvalve, and in particular, to a valve that opens and closes an opening through a displacement member, and also relates to a valve seat member included in the valve.

2. Description of the Related Art

Generally, items such as mobile personal computers that include fuel batteries for electrical power are being developed. Liquid fuels, such as methanol and ethanol, are used as fuel, and by supplying the fuel to a reacting furnace via a micropump, the reacting furnace causes the fuel and air to react to generate electrical power. In this type of fuel battery system, an unintended flow of fuel in the forward direction due to gravity can occur and unnecessary fuel can be supplied to the reacting furnace even when the pump is stopped. This can lead to a surplus of electric power generation. Micropumps are equipped with check valves. However, the check valves are valves for stopping a reverse flow and cannot block a forward flow.

Japanese Unexamined Patent Application Publication No. 62-28585 discloses a piezoelectric active valve that includes a valve housing that includes a flow inlet and a flow outlet for a fluid, and a valve body that includes a tabular piezoelectric element. Specifically, the periphery of the valve body is fixedly held against the valve housing, and an opening is provided in the valve housing region facing the central portion of the valve body. As a result of an application of a voltage to the piezoelectric element, the valve body bends in the plate thickness direction and the opening can be opened and closed as a result of the bending.

In general, a valve seat member made of a soft material, such as rubber, is fixed to the opening since a sufficient seal is not produced by simply making the previously described valve body contact the opening of the valve housing directly. One method of fixing the valve seat is to use an adhesive to fix the valve seat to the opening of the valve housing. However, when the intended fluid is an organic solvent, such as, for example, methanol, which is used as a fuel for fuel batteries, there is a possibility that the adhesive will be corroded, the fixing will become unstable, and the bond will peel off. Furthermore, if the valve seat is fixed to the valve housing in a tilted state or in an off-center state, the valve seat and the valve body do not make proper contact and consistent sealing performance may not be obtained.

SUMMARY OF THE INVENTION

To overcome the problems described above, preferred embodiments of the present invention provide a microvalve in which a displacement member can open and close an opening of a valve housing with consistent sealing performance, and a valve seat member.

A preferred embodiment of the present invention provides a microvalve that includes a valve housing that includes an opening, a displacement member arranged to be displaceable in a direction towards the opening, and a valve seat member that is arranged in the opening and provides a seal between the valve housing and the displacement member. The valve seat member preferably includes a cylinder portion that is disposed in the opening with a gap therebetween and the cylinder portion includes a through hole in a central portion thereof, a flange portion preferably having a diameter greater than a diameter of the cylinder portion and that is provided at an axial end of the cylinder portion, and a seal portion that is provided at the periphery of the flange portion and is thicker than the flange portion. In an open state, at least one of a flow path through the through hole and a flow path through a gap between the cylinder portion and the opening in the valve housing is open. In a closed state, the seal portion is sandwiched between the displacement member and a valve housing seal surface disposed around the opening.

A valve seat member according to a preferred embodiment of the present invention is preferably included in a microvalve, for example, that includes a valve housing with an opening and a displacement member that is arranged to be displaceable in a direction towards the opening. The valve seat member, which provides a sealing effect when the displacement member closes the opening, preferably includes a cylinder portion that is disposed in the opening with a gap therebetween and includes a through hole in a central portion thereof, a flange portion having a diameter greater than a diameter of the cylinder portion and that is provided at an axial end of the cylinder portion, and a seal portion that is provided at the periphery of the flange portion, that is thicker than the flange portion, and that is arranged to be sandwiched between the displacement member and a valve housing seal surface that is arranged around the opening.

According to a preferred embodiment of the present invention, the valve seat member is preferably not fixed to the valve housing, but is movably fitted in the opening of the valve housing. Specifically, the valve seat member preferably includes the cylinder portion, the flange portion, and the seal portion, and the cylinder portion is preferably fitted into the opening so that a gap exists that allows fluid to pass. The seal portion is preferably thicker than the flange portion and is arranged to be sandwiched between the displacement member and the valve housing seal surface that is arranged around the opening. In an open state, at least one flow path of a two-path system that includes the flow path through the through hole provided in the cylinder portion and the flow path through the gap between the cylinder portion and the opening, is preferably open. Specifically, when the valve seat member is in contact with the valve housing, fluid can flow through the through hole. Conversely, when the valve seat member is in contact with the displacement member, fluid can flow through the gap provided between the outer surface of the cylinder portion and the inner surface of the opening. Thus, a flow path can be open when the valve seat member is in any position. In a closed state, both of the flow paths of the aforementioned two-path system are closed at the same time due to the valve seat member seal portion being sandwiched between the displacement member and the seal surface. Regardless of the mounting position, a highly reliable valve can be provided due to the two-path system in the open state. Furthermore, a valve having many applications can be provided since the opening can be reliably opened or closed even when the pressure upstream or downstream of the opening is high.

The cylinder portion may preferably have a diameter such that the seal portion does not move away from the seal surface even when the valve seat member moves the maximum amount in the radial direction of the opening, and may preferably have a length such that the cylinder portion does not move away from the opening when the displacement member is displaced the maximum amount in the direction away from the opening. With this configuration, the valve seat member cannot disengage from the opening if the cylinder is inserted into the opening and the displacement member is attached to the valve housing, and thus, a valve having a reduced height is provided. Also, stable sealing performance can be achieved regardless of the microvalve position.

The seal portion is preferably thicker than the flange portion around the entire periphery of the seal portion. When the seal portion is flat, the surface pressure of the portion at which seal surface and the displacement member are in contact is relatively low and the sealing performance deteriorates. Therefore, a thick annular seal portion at the periphery of the flange portion is preferably provided and by sandwiching the seal portion between the seal surface and the displacement member, the seal portion surface pressure increases and significantly improved sealing performance is achieved. The portion of the seal portion that is thicker than the flange portion may preferably be rim-shaped or rib-shaped, for example. The cross section of the seal portion may be any suitable shape, such as circular, substantially circular, triangular, or substantially triangular, for example. With a circular, substantially circular, triangular, or substantially triangular cross section, the seal surface and the displacement member contact portions are substantially linear contacts to thereby further improve the sealing performance. A circular or substantially circular cross section is more preferable since wear and deformation of the edge is prevented.

The displacement member according to a preferred embodiment of the present invention may preferably include an actuator that can be spontaneously displaced by an application of an electric signal, or may preferably be a member, for example, a diaphragm, that is displaced by an external pressure, such as a pressure differential or other suitable external pressure. However, a member that is flat or substantially flat and that does not include any bumps or grooves on the contact surface where the displacement member contacts the valve seat member is preferable. The displacement member may preferably be arranged to be separated from the valve seat member in a normal state so as to maintain the open state and enter a closed state by contacting the valve seat member when displaced. Conversely, the displacement member may preferably be arranged to be touching the valve seat member in a normal state so as to maintain a closed state and enter an open state by moving away from the valve seat member when displaced.

An actuator may preferably include a piezoelectric element that bends in the thickness direction by applying a voltage signal. In particular, when using a rectangular or substantially rectangular plate-shaped piezoelectric element, both longitudinal ends of the piezoelectric element may preferably be fixed in the valve housing and the seal portion of the valve seat member may be pressed by the longitudinally central portion of the piezoelectric element. By fixing the longitudinal ends of the rectangular plate-shaped piezoelectric element in the valve housing, the longitudinally central portion preferably has a greater displacement than fixing the periphery of a circular or substantially circular plate-shaped piezoelectric element in the valve housing.

When using, as a displacement member, a diaphragm that divides the inside of the valve housing into two valve chambers, preferably, a valve seat member may be arranged in an opening provided in one of the valve chambers, the diaphragm may be displaced by differential pressure between the two valve chambers, and the seal portion of the valve seat member may be pressed by the diaphragm. In this manner, a passive valve can be provided that automatically operates through differential pressure without inputting electric signals from outside.

With the microvalve according to various preferred embodiments of the present invention, fixing using adhesives is unnecessary since the valve seat member is movably arranged in the opening of the valve housing and the microvalve can be used even when organic solvents, such as methanol, for example, are used as fluids. Further, since at least one flow path of the two-path system provided by the flow path through the through hole of valve seat member and the flow path through the gap between cylinder portion of the valve seat member and the opening is open during the open state, the open state can be assured regardless of the position of the valve seat member, the attachment direction of the valve is not affected, and a microvalve having stable and consistent performance is provided. Further, since the thick seal portion of the valve seat member is sandwiched between the displacement member and the seal surface of the valve housing, the valve seat member can move by itself to a stable position along with the movement of the displacement member, and a desirable sealing performance can be obtained.

With the valve seat member according to various preferred embodiments of the present invention, the valve seat member can be easily mounted since the valve seat member can be mounted by merely fitting the cylinder portion into the opening of the valve housing. The valve seat member obtains a stable opening and closing performance even when the amount of displacement of the displacement member is relatively small.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below reference to the drawings.

First Preferred Embodiment

Figure 1A:
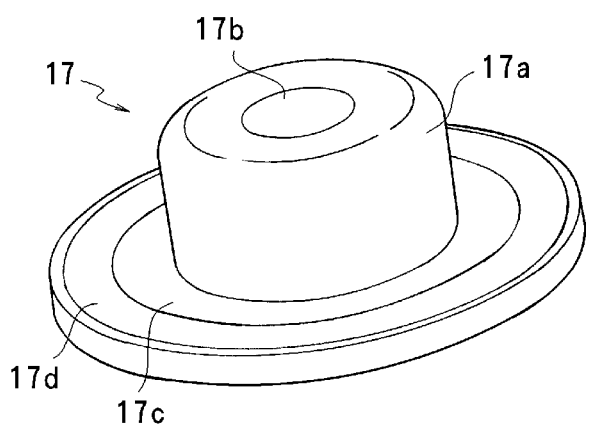
FIG. 1A is an external perspective drawing of a valve seat member according to a preferred embodiment of the present invention.
Figure 1B:
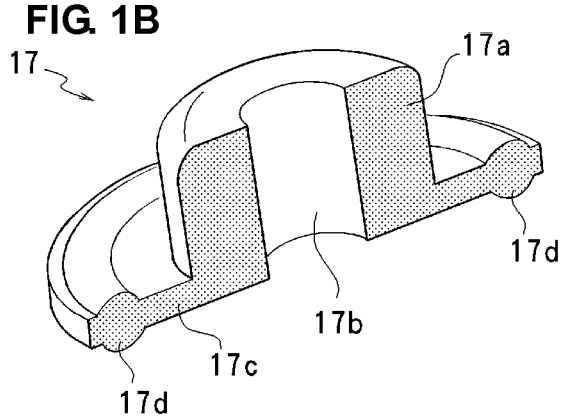
FIG. 1B is a cross section perspective drawing of the valve seat member according to a preferred embodiment of the present invention.

FIGS. 1 to 3 illustrate a valve seat member 17 according to a preferred embodiment of the present invention. As illustrated in FIG. 1, the valve seat member 17 preferably integrally includes a cylinder portion 17a that includes a through hole 17b in a central portion thereof, a flange portion 17c that has a circumference greater than that the cylinder portion 17a and is provided at an axial end of the cylinder portion 17a. An annular seal portion 17d that is thicker than the flange portion 17c is preferably provided around the periphery of the flange portion 17c. The valve seat member 17 is preferably integrally made from a rubber material such as fluorine, silicone, or EPDM, for example. The cylinder portion 17a is preferably arranged in an opening 15a of a top plate 15 of a valve housing 10, and the seal portion 17d contacts the top surface of the top plate 15 (seal surface 15c). The seal portion 17d according to the first preferred embodiment is preferably annular and has a circular or substantially circular cross section, for example. The shape of the cross section of the seal portion 17d is not limited to a circular or substantially circular shape. However, the cross section shape is preferably an annular rib that protrudes from the front and back of the flange portion 17c so that linear contact between a displacement member 20 and the seal surface 15c of the top plate 15 is provided.

Figure 2A:
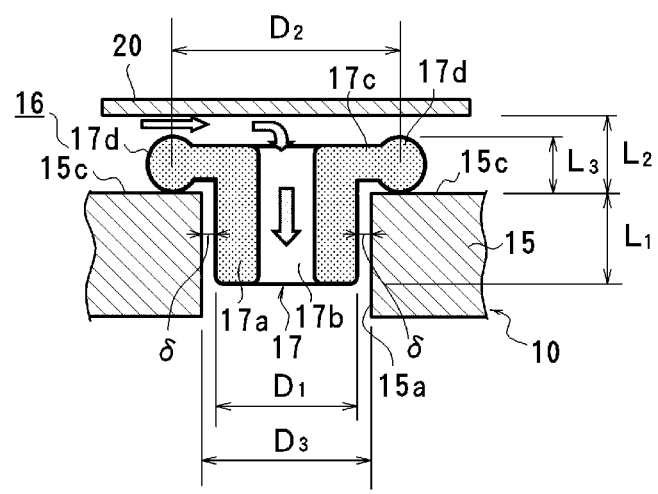
FIGS. 2A and 2B are enlarged cross sections of an open state of a microvalve that uses the valve seat member of FIG. 1.
Figure 2B:
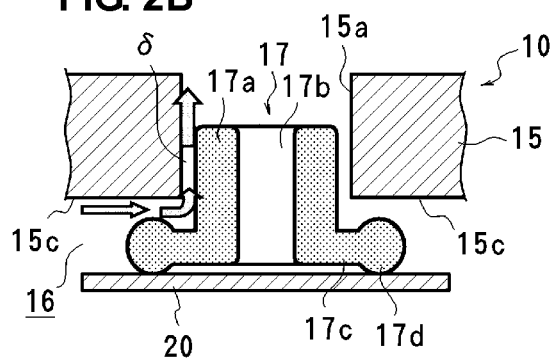

FIGS. 2A and 2B show an open state (state when the displacement member 20 is separated from the valve seat member 17). The displacement member 20 is freely displaceable in the direction towards and away from the opening 15a is disposed above the top plate 15 to define a valve chamber 16 between the top plate 15 and the displacement member 20. The cylinder portion 17a of the valve seat member 17 is arranged in the opening 15a of the top plate 15 so as to be movable in the axial and radial directions. The diameter of the cylinder portion 17a is preferably less than the diameter of the opening 15a so that a gap δ that allows fluid to pass between the cylinder portion 17a and the opening 15a is provided. The seal portion 17d can freely move away from the seal surface 15c and the displacement member 20, and the gap δ is preferably set so that the seal portion 17d is always disposed above the seal surface 15c even when the cylinder portion 17a is skewed towards one side of the opening 15a. For example, assuming that the diameter of the cylinder portion 17a is D1, the diameter of the seal portion 17d measured from center to center is D2, and the diameter of the opening 15a is D3, then the equation $$D1+D2>2\times D3$$

is preferably used to set the gap δ.

Furthermore, the length L1 of the cylinder portion 17a is preferably set so that the cylinder portion 17a does not extend out of the opening 15a even when the displacement member 20 is displaced to the maximum amount in the direction toward the top plate 15. Specifically, assuming that the maximum distance between the displacement member 20 and the seal surface 15c is L2, and the thickness of the seal portion 17d is L3, then the equation $$L1>L2-L3$$

is preferably used to set the length L1 of the cylinder portion 17a. In other words, the cylinder portion length L1 is preferably greater than the length that the displacement member 20 can move (L2-L3), for example. The length L1 of the cylinder portion 17a is preferably equal to or less than the thickness of the top plate 15 so as to avoid interfering with the mountability of the valve. In the first preferred embodiment, the cylinder portion length L1 is preferably the distance from the bottom surface of the seal portion 17d to the tip of the cylinder portion 17a, for example.

In the open state, fluid is allowed to flow regardless of the position of the valve seat member 17 since the flow is assured with a two-path system including a flow path through the gap δ between the cylinder portion 17a and the opening 15a and a flow path through the through hole 17b in the middle of the cylinder portion 17a. Specifically, when the valve seat member 17 is in contact with the seal surface 15c as illustrated in FIG. 2A, a flow path is provided through the through hole 17b, and when the valve seat member 17 is in contact with the displacement member 20 as illustrated in FIG. 2B, a flow path is provided through the gap δ between the cylinder portion 17a and the opening 15a. FIG. 2B illustrates the valve in a vertically flipped arrangement. Since the flow path is provided when the valve seat member 17 is in any position, the features of the valve seat are the same regardless of the mounting position of the valve. FIGS. 2A and 2B show the opening 15a as an example of a flow outlet. However, the opening 15a may also be a flow inlet. Specifically, the flow direction of the fluid is not limited to flowing out from the valve chamber 16 through the opening 15a. The valve seat member 17 may also be used when fluid is flowing into the valve chamber 16 from the opening 15a.

Figure 3A:
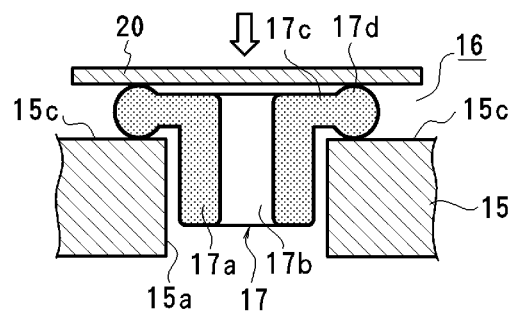
FIGS. 3A and 3B are enlarged cross sections of a closed state of a microvalve that uses the valve seat member of FIG. 1.
Figure 3B:
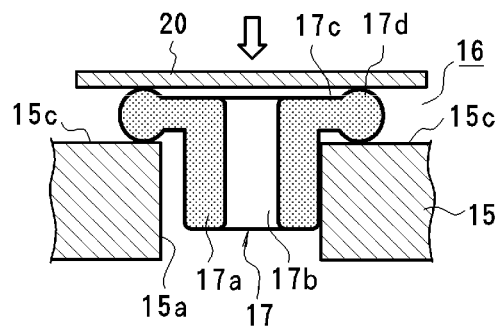
Figure 4:
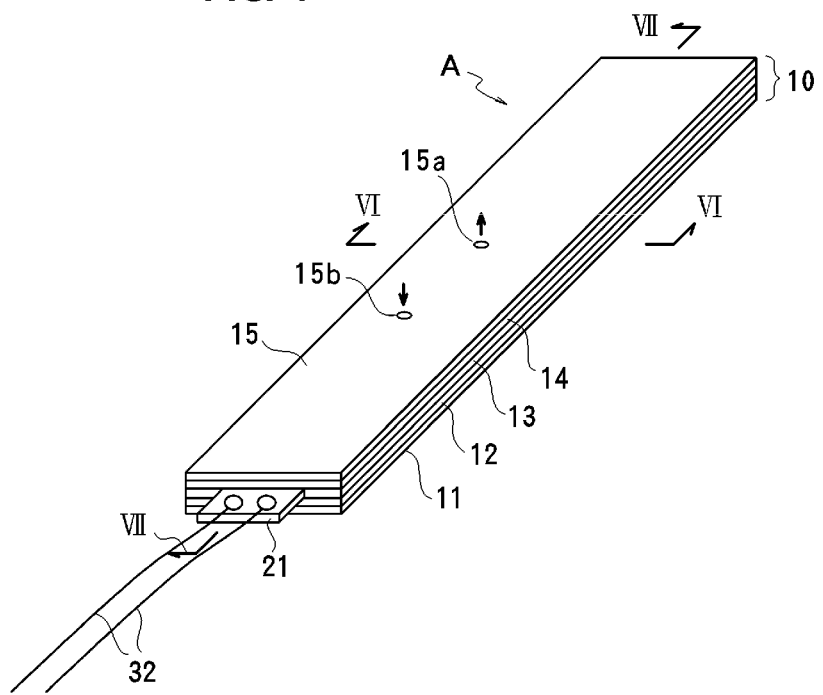
FIG. 4 is a perspective drawing of a first preferred embodiment of a microvalve according to the present invention.

FIGS. 3A and 3B show a closed state in which the displacement member 20 is displaced toward the opening 15a. The seal portion 17d is sandwiched between the seal surface 15c and the displacement member 20 due to the displacement of the displacement member 20, and the flow paths of the two-path system are closed at the same time. At this time, the cylinder portion 17a is not limited to being positioned in the center of the opening 15a as shown in FIG. 3A. The cylinder portion 17a may be skewed toward one side of the opening 15a as shown in FIG. 3B Even in this case, the seal portion 17d is always on the seal surface 15c and sealing performance is not deteriorated. In particular, when the cross section of the seal portion 17d is circular or substantially circular, linear contact is provided on the displacement member 20 and on the seal surface 15c so as to obtain a high surface pressure and more reliable sealing performance.

As previously described, since the valve seat member 17 is not fixed to the valve housing 10, the valve seat member 17 can move by itself to a stable position along with the movement of the displacement member 20 and more reliable sealing performance is obtained. Further, even if dirt and other contaminants adhere to the surfaces of the seal portion 17d, the seal surface 15c, the displacement member 20, the opening 15a, or other portions of the valve, a self-cleaning effect that removes dirt via the flow of fluid through the opening 15a is provided since the valve seat member 17 can move freely within a certain range.

Second Preferred Embodiment

Figure 5:
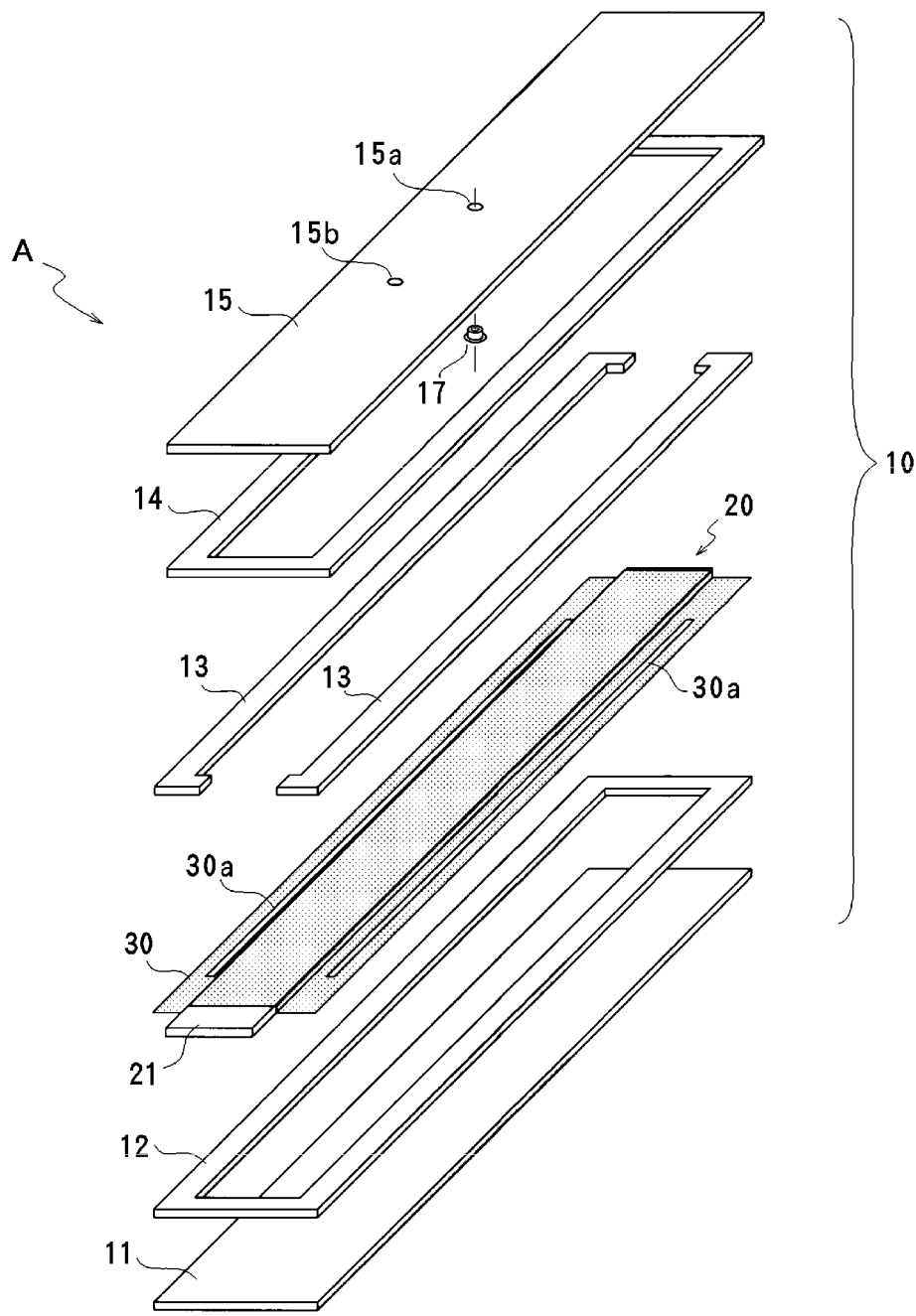
FIG. 5 is an exploded perspective of the microvalve shown in FIG. 4.
Figure 6:
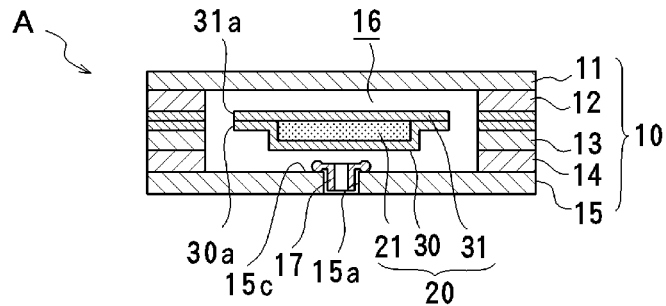
FIG. 6 is a cross section along line VI-VI of FIG. 4.

FIG. 4 to FIG. 9 show a preferred embodiment of a microvalve that uses the valve seat member 17 described above. A microvalve A according to the present preferred embodiment is preferably used as an active valve to control the flow of fluids, such as methanol, for example. The microvalve A preferably includes a box-shaped valve housing 10 preferably made of a hard material, such as metal or resin, for example, and a rectangular or substantially plate-shaped actuator 20. As shown in FIG. 5, the valve housing 10 is preferably a lamination of a rectangular or substantially rectangular plate-shaped bottom plate 11 that is wider than the actuator 20, a rectangular plate-shaped first frame 12 disposed on the upper surface of the bottom plate 11 and with an inside width wider than the actuator 20, a pair of U-shaped press plates 13 disposed on the upper surfaces of both longitudinal sides of the first frame 12 and having a thickness approximately the same as the thickness of the actuator 20, a second frame 14 that is disposed on the upper surfaces of the actuator 20 and the press plates 13 and having the same or substantially the same shape as the first frame 12, and a top plate 15 that is disposed on the upper surface of the second frame 14. Both longitudinal ends of the actuator 20 are fixed by the valve housing 10 so that the longitudinal central portion of the actuator 20 is freely displaceable.

In the present preferred embodiment, a flow outlet (opening) 15a is preferably provided in a central portion of the top plate 15 and a flow inlet 15b is preferably provided at a position on one side of the flow outlet 15a so that the central opening 15a is opened and closed by the actuator 20. A flat seal surface 15c is preferably provided on the inner surface of the top plate 15 around the opening 15a. Alternatively, the flow inlet (opening) 15b may preferably be provided in the central portion and the flow outlet 15a may preferably be provided at a position on one side of the flow inlet 15b. Specifically, the opening in which the valve seat member 17 is disposed may be the flow outlet 15a or the flow inlet 15b. Also, the openings may be provided in the bottom plate 11. The aforementioned portions 11 to 15 are laminated with the actuator 20 in between to define the valve housing 10. A valve chamber 16 is provided that allows displacement of the actuator 20 between the bottom plate 11 and the top plate 15. The rubber valve seat member 17 is preferably disposed in an unfixed state in the opening 15a that opens into the valve chamber 16. FIG. 6 to FIG. 9 show the microvalve A arranged with the top plate on the bottom and the bottom plate on the top. Therefore, the valve seat member 17 is arranged below the actuator 20.

Figure 8:
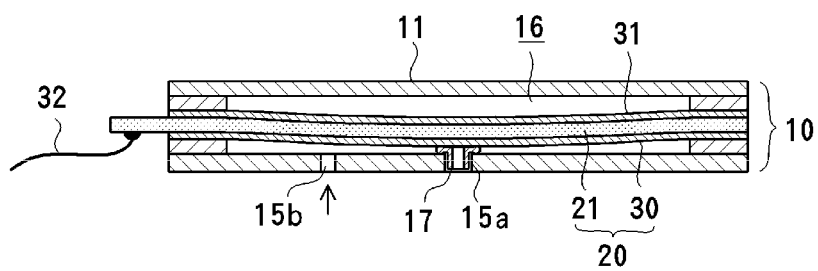
FIG. 8 is a cross section along line VII-VII of FIG. 4 when the valve is closed.

FIG. 8 shows the valve in a closed state due to a direct voltage being applied to a piezoelectric element 21 so that the central portion of the piezoelectric element 21 is projecting downward. The central portion of the actuator 20 displaces and clamps the seal portion 17d of the valve seat member 17 to the seal surface 15c so that the opening 15a is firmly sealed. Even in a closed state when a high pressure is exerted from the flow inlet 15b, the pressure does not act solely on the bottom surface of the piezoelectric element 21, and also acts on the top surface in the same manner so that the closed state can be maintained even without applying a high voltage.

Figure 7:
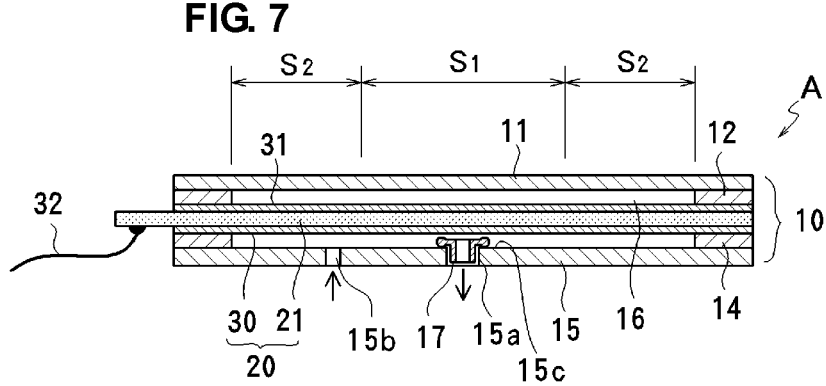
FIG. 7 is a cross section along line VII-VII of FIG. 4.
Figure 9:
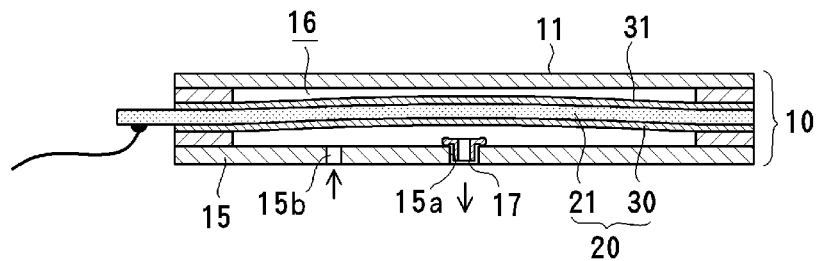
FIG. 9 is a cross section along line VII-VII of FIG. 4 of another example when the valve is open.

FIG. 9 shows another example of an open state of the valve and shows a state in which a direct voltage is applied to the piezoelectric element 21 so that the central portion of the piezoelectric element 21 is projecting upward and away from the opening 15a. By displacing the actuator 20 upward, the distance between the valve seat member 17 and the actuator 20 is increased, the flow path space is increased, and the flow resistance when the valve is open is reduced. When the valve is open, upward displacement of the actuator 20 as shown in FIG. 9 is not necessary, and the valve may preferably be opened in a state without applying voltage as shown in FIG. 7. Specifically, the actuator 20 may preferably merely be changed between two states: the open state shown in FIG. 7 and the closed state shown in FIG. 8.

In FIG. 7 to FIG. 9, the amount of displacement of the central portion of the actuator 20 and the distance between the actuator 20 and the valve seat member 17 are shown as being large in order to exaggerate the displacement of the actuator 20. However, in actuality, the amount of displacement of the central portion of the actuator 20 is relatively small (for example, approximately ±100 μm or less) and the distance between the actuator 20 and the valve seat member 17 is very small. Thus, displacing the actuator 20 in a direction away from the opening 15a in the open state as shown in FIG. 9 is effective to reduce flow resistance. Even though the actuator 20 is displaced away as shown in FIG. 9, the length L1 of the cylinder portion 17a is set as described in FIG. 2 so that the valve seat member 17 does not come out of the opening 15a.

The actuator 20 of the present preferred embodiment preferably includes the rectangular plate-shaped bimorph piezoelectric element 21, for example. The piezoelectric element 21 preferably includes a first region S1 in the longitudinal central portion, and second regions S2 at both longitudinal ends as shown in FIG. 7, and the first region S1 and the second regions S2 preferably bend in opposite directions when a voltage is applied to the piezoelectric element 21. Specifically, when the central first region S1 is displaced to protrude upward, the second regions S2 at both ends are displaced to protrude downward. Conversely, when the central first region S1 is displaced to protrude downward, the second regions S2 at both ends are displaced to protrude upward. As a result, even when both longitudinal ends are fixed by the valve housing 10, a large displacement amount is achieved in the longitudinal central portion.

The periphery of the area of the piezoelectric element 21 facing the valve chamber 16 is preferably covered with insulation films 30 and 31, for example, to prevent contact with fluid. The insulation films 30 and 31 are preferably soft, thin films that do not substantially restrict the displacement of the piezoelectric element 21, and materials that have a high gas barrier performance and are not corroded by fluids, for example. Both longitudinal ends of the piezoelectric element 21 including the insulating films 30 and 31 are preferably disposed in a bridging manner on the upper surfaces of both longitudinal ends of the first frame 12, and then the press plates 13, the second frame 14, and the top plate 15 are disposed on top so that the portion of the piezoelectric element 21 excluding both of the ends is freely displaceable inside the enclosed valve chamber 16. One end of the piezoelectric element 21 that is not covered with the insulating films 30 and 31 preferably extends out from the valve housing 10 and power supply wires 32 are connected to the extending portion (see FIG. 4).

Slit-shaped elongated holes 30a and 31a are preferably provided in both lateral end portions, i.e., both side portions along the longitudinal edges of the piezoelectric element 21, of the insulation films 30 and 31. The elongated holes 30a and 31a are positioned within the valve chamber 16. The lengths of the elongated holes 30a and 31a are preferably approximately the same as the lengthwise dimension of the valve chamber 16, for example. As a result, both lateral side portions can freely move relative to the valve housing 10 as opposed to both longitudinal ends of the piezoelectric element 21 that are firmly fixed by the valve housing 10. Furthermore, fluid pressure of fluid that enters from the flow inlet 15b via the elongated holes 30a and 31a in the insulation films 30 and 31 preferably acts not only on the front surface side (side facing the flow outlet 15a) of the piezoelectric element 21, but also acts on the back surface side. Therefore, the pressure on both sides of the piezoelectric element 21 is preferably the same or substantially and a relatively small amount of driving power can be used to close the flow outlet 15a. In particular, with a structure in which the flow outlet 15a is opened and closed by the piezoelectric element 21, since the piezoelectric element 21 is pressed against the flow outlet 15a by the high back pressure from the flow inlet 15b in a closed valve state, outflow of fluid can be more effectively prevented. The actuator 20 is not limited to the piezoelectric element configuration described above. A unimorph configuration in which the piezoelectric element is attached to a steel plate, or a bimorph configuration in which piezoelectric elements are attached to both sides of a steel plate may preferably be used. Furthermore, the shape is not limited to a rectangular or substantially rectangular shape, and a circular or substantially circular shape may preferably be used. Furthermore, instead of a normally-open valve including an open opening in a state in which no electric signal is applied to the actuator, a normally-closed valve may also be used.

Third Preferred Embodiment

Figure 10:
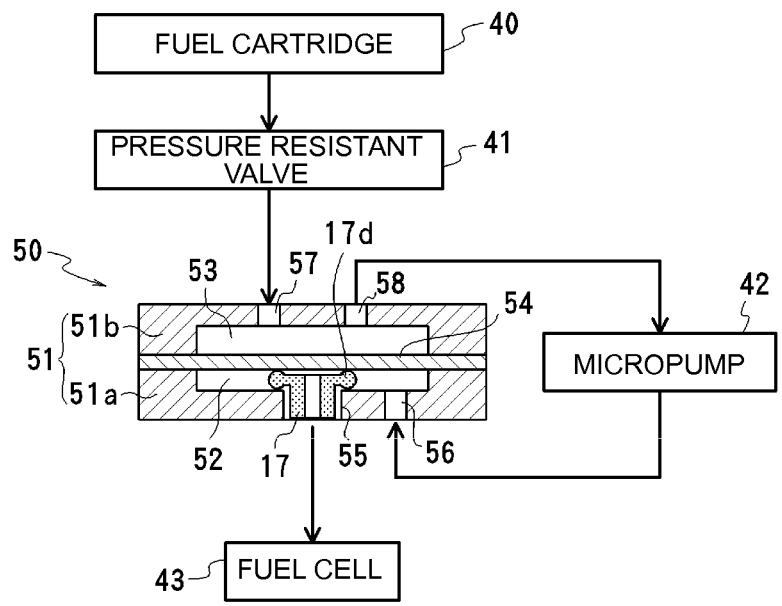
FIG. 10 is a block diagram of a second preferred embodiment of a microvalve according to the present invention used in a fuel supply device.

FIG. 10 shows a microvalve according to another preferred embodiment of the present invention that is used in fuel cell supply device. The supply device preferably includes a fuel cartridge 40, a pressure resistant valve 41, a micropump 42, and a microvalve 50. The fuel, for example, methanol, included in the fuel cartridge 40 is supplied from the microvalve 50 via the pressure resistant valve 41 and the micropump 42 to a fuel cell 43.

The microvalve 50 is an example of a passive valve that opens according to the motions of the micropump 42, and preferably includes a valve housing 51 including two upper and lower cases 51a and 51b, and a diaphragm 54 sandwiched between the cases 51a and 51b and dividing the value housing 51 into a first valve chamber 52 and a second valve chamber 53. The valve housing 51 is preferably made of a hard material, such as metal or resin, for example, and the diaphragm 54 is preferably made of a thin resin plate or metal plate, for example. A first flow outlet hole 55 connected to the fuel cell 43, and a first flow inlet hole 56 connected to a discharge port of the micropump 42 are preferably provided in the first valve chamber 52. A second flow inlet hole 57 arranged to receive fuel from the pressure resistant valve 41, and a second flow outlet hole 58 connected to an intake port of the micropump 42 are preferably provided in the second valve chamber 53. The cylinder portion 17a of the valve seat member 17 shown in FIG. 1 to FIG. 3 is preferably disposed in the opening 55 with the gap δ.

The micropump 42 is preferably a well known pump, for example, whose intake port and discharge port are provided with respective check values. Also, the fuel cartridge 40, the pressure resistant valve 41, and the fuel cell 43 are preferably well known, for example, and a detailed explanation is omitted. The pressure resistant valve 41 is not always required.

Herein, the principle of operation of the microvalve 50 will be described. Assuming that the downward acting pressure of the fluid on the top surface of the diaphragm 54 in the second valve chamber 53 is F2, and the upward acting pressure of the fluid on the bottom surface of the diaphragm 54 in the first valve chamber 52 is F1, F1 and F2 may be denoted as the pressure receiving area×fluid pressure. In the first valve chamber 52, the pressure receiving area on the second valve chamber 53 side is greater than the pressure receiving area on the first valve chamber 52 side since the area inside the seal portion 17d of the valve seat member 17 is excluded from the bottom side pressure receiving area of the diaphragm 54. When F2>F1, the opening 55 is closed in the first valve chamber 52 since the diaphragm 54 is pressing against the valve seat member 17. Conversely, when F1>F2, the diaphragm 54 rises and the opening 55 is open in the first valve chamber 52.

Fuel flows into the second valve chamber 53 from the fuel cartridge 40 and then flows into the inlet port of the pump 42. When the pump 42 is not activated, fluid pressure P1 in the first valve chamber 52 becomes less than a fluid pressure P2 in the second valve chamber 53 only by the amount of pressure loss due to the pump 42, and thus P2>P1. As a result, the force acting on the rise and fall of the diaphragm 54 is F2>F1, the opening 55 is closed, and fuel is not supplied from the opening 55. When the pump 42 is activated and fuel is supplied to the first valve chamber 52, the pressure P1 gradually increases. When F2<F1, the diaphragm 54 moves, the opening 55 is opened, and fuel is supplied from the opening 55 to the fuel cell 43.

As shown in FIG. 10, if the valve seat member 17 is disposed in the microvalve 50 in a position below the diaphragm 54, when the diaphragm 54 moves upward and the diaphragm 54 and the valve seat member 17 are separated, the fluid in the first valve chamber 52 is discharged through the through hole 17b in the valve seat member 17. However, when the microvalve 50 is used in a vertically flipped arrangement, the valve seat member 17 is able to be displaced while still being in contact with the diaphragm 54 when the diaphragm 54 moves toward the second valve chamber 53 side. Even in this case, the fluid in the first valve chamber 52 can be discharged through the gap δ since the gap δ is provided between the opening 55 and the cylinder portion 17a of the valve seat member 17.

When the pump 42 is not activated, since F2>F1 due to the difference in pressure receiving areas of the first valve chamber 52 and the second valve chamber 53, the diaphragm 54 presses against the valve seat member 17. As a result, the opening 55 can be securely closed and a highly reliable microvalve is provided. When pressure inside the fuel cartridge 40 rises due to an increase in the ambient temperature, for example, the fuel flows into the pump 42 via the second valve chamber 53. Although the pump 42 includes check valves, a forward flow cannot be blocked, and therefore, there is a possibility that too much fuel may be supplied to the fuel cell 43. In this case, with the microvalve 50, even when the pressure P2 rises in the second valve chamber 53, the closed state of the opening 55 is maintained and an excess supply of fuel is effectively prevented since the diaphragm 54 acts by merely pressing against the valve seat member 17 and the relation F2>F1 is maintained.

Fourth Preferred Embodiment

Figure 11:
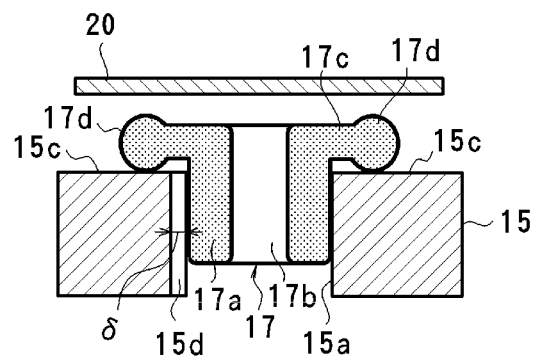
FIG. 11 is cross section of a main portion of a third preferred embodiment of a microvalve according to the present invention.

FIG. 11 shows a microvalve according to another preferred embodiment of the present invention. The valve seat member 17 is the same or substantially the same as shown in FIG. 1 to FIG. 3. The opening 15a of the valve housing 15 has a diameter slightly greater than that of the cylinder portion 17a so that the cylinder portion 17a of the valve seat member 17 can slide easily. On the inside surface of the opening 15a, one or a plurality of vertical grooves 15d that extend in the axial direction is preferably provided, and a gap δ is provided due to the vertical grooves 15d. The width of the gap δ is required to be a width that is less than a width where the seal portion 17d of the valve seat member 17 touches the seal surface 15c. In the present preferred embodiment, the valve seat member 17 can move easily in the valve housing 15 in the axial and rotational directions. However, the valve seat member 17 moves very little in the radial direction. As a result, the contact positions of seal portion 17d of the valve seat member 17 and the seal surface 15c and the displacement member 20 are substantially constant and a stable sealing performance is maintained.

Fifth Preferred Embodiment

Figure 12:
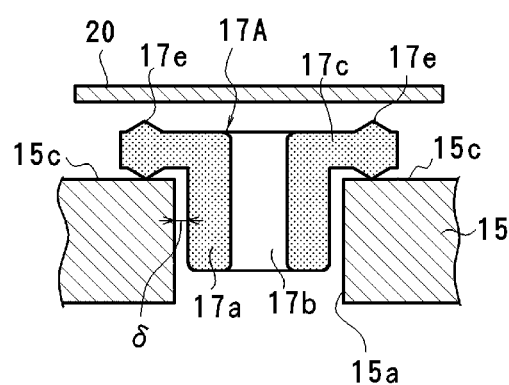
FIG. 12 is cross section of a main portion of a fourth preferred embodiment of a microvalve according to the present invention.

FIG. 12 shows a microvalve according to another preferred embodiment of the present invention. In the present preferred embodiment, only the shape of a seal portion 17e of the valve seat member 17A is different from that of the valve seat member 17 and the remaining configuration are substantially the same as shown in FIG. 1 to FIG. 3. The seal portion 17e preferably has a triangular or substantially triangular cross section, for example, and protrudes from the front and back surfaces of the flange portion 17c. In this case, a desired sealing performance is also achieved since linear contact is provided between the seal portion 17e and the seal surface 15a of the valve housing 15, and between the seal portion 17e and the displacement member 20.

The present invention is not limited to the aforementioned preferred embodiments, and various modifications are possible. Since the microvalve can be configured to be small and short, the microvalve according to preferred embodiments of the present invention is effective as a passive valve or as an active valve used in water cooling circulation pathways, in fuel cell fuel supply pathways of mobile devices such as personal computers, and other suitable devices, for example. However, such uses are not restrictive.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A microvalve comprising:
   a valve housing including an opening and a seal surface disposed around the opening;
   a displacement member arranged to be displaceable in a direction towards and away from the opening; and
   a valve seat member disposed in the opening and providing a seal between the valve housing and the displacement member; wherein
   the valve seat member includes a cylinder portion that is disposed in the opening with a gap therebetween and includes a through hole in a central portion of the cylinder portion, a flange portion that has a diameter greater than a diameter of the cylinder portion and is provided at an axial end of the cylinder portion, and a seal portion that is provided on a periphery of the flange portion and that has a thickness greater than that of the flange portion;
   in an open state, at least one of a flow path through the through hole and a flow path through the gap between the cylinder portion and the opening is open, and in a closed state, the seal portion is sandwiched between the displacement member and the seal surface of the valve housing;
   the valve seat member, including the cylinder portion, the flange portion, and the seal portion, is an integral, unitary member such that the cylinder portion, the flange portion, and the seal portion are made of the same material;
   the seal portion extends axially above and axially below the flange portion;
   the seal portion defines an outermost portion of the periphery of the flange portion; and
   the displacement member contacts the outermost portion of the periphery of the flange portion.

2. The microvalve according to claim 1, wherein the cylinder portion has a diameter such that the seal portion does not move away from the seal surface of the valve housing when the valve seat member is moved a maximum amount in a radial direction of the opening, and a length such that the cylinder portion does not extend out of the opening when the displacement member is moved a maximum amount away from the opening.

3. The microvalve according to claim 1, wherein the seal portion has a circular or substantially circular cross section.

4. The microvalve according to claim 1, wherein:
   the displacement member includes an actuator arranged to bend in the thickness direction by applying an electrical signal;
   a peripheral portion or both end portions of the actuator are fixed by the valve housing; and
   a central portion of the actuator presses the seal portion of the valve seat member.

5. The microvalve according to claim 1, wherein:
   the displacement member includes a diaphragm arranged to divide the valve housing into two valve chambers;
   the valve seat member is disposed in an opening provided in one of the two valve chambers; and
   the diaphragm is displaced by a pressure differential in the two valve chambers and the seal portion of the valve seat member is pressed by the diaphragm.

6. A valve seat member for use in a microvalve including a valve housing including an opening and a displacement member that is displaceable in a direction towards and away from the opening, the valve seat member providing a sealing effect when the displacement member closes the opening, the valve seat member comprising:
   a cylinder portion arranged to be disposed in the opening with a gap therebetween and including a through hole in a central portion thereof;
   a flange portion having a diameter greater than that of the cylinder portion and being provided at an axial end of the cylinder portion;
   a seal portion provided at a periphery of the flange portion, having a thickness greater than that of the flange portion, and being arranged to be sandwiched between the displacement member and a valve housing seal surface that is formed around the opening;
   the valve seat member, including the cylinder portion, the flange portion, and the seal portion, is an integral, unitary member such that the cylinder portion, the flange portion, and the seal portion are made of the same material;
   the seal portion extends axially above and axially below the flange portion;
   the seal portion defines an outermost portion of the periphery of the flange portion; and
   the displacement member contacts the outermost portion of the periphery of the flange portion.

* * * * *

UNITED STATES PATENT AND TRADEMARK OFFICE
CERTIFICATE OF CORRECTION

PATENT NO.      : 8,480,057 B2
APPLICATION NO. : 12/977228
DATED           : July 9, 2013
INVENTOR(S)     : Yuki Takahashi et al.

It is certified that error appears in the above-identified patent and that said Letters Patent is hereby corrected as shown below:

On the Title Page:

In Item (75) Inventors, please correct the second inventor's name as follows:

Kenichi Kotani, Nagaokakyo (JP).

In Item (63) Related U.S. Application Data, please include the data as follows:

Continuation of application No. PCT/JP2009/061475, filed on June 24, 2009.

Signed and Sealed this
Tenth Day of September, 2013

Teresa Stanek Rea
*Acting Director of the United States Patent and Trademark Office*